(12) United States Patent
Fang et al.

(10) Patent No.: US 10,958,336 B2
(45) Date of Patent: Mar. 23, 2021

(54) PHASED ARRAY ANTENNA FOR USE WITH LOW EARTH ORBIT SATELLITE CONSTELLATIONS

(71) Applicant: Metawave Corporation, Palo Alto, CA (US)

(72) Inventors: Jun Fang, Palo Alto, CA (US); Chiara Pelletti, Palo Alto, CA (US)

(73) Assignee: METAWAVE CORPORATION, Carlsbad, CA (US)

( * ) Notice: Subject to any disclaimer, the term of this patent is extended or adjusted under 35 U.S.C. 154(b) by 0 days.

(21) Appl. No.: 16/425,817

(22) Filed: May 29, 2019

(65) Prior Publication Data

US 2019/0372656 A1    Dec. 5, 2019

Related U.S. Application Data

(60) Provisional application No. 62/677,599, filed on May 29, 2018.

(51) Int. Cl.
| | | |
|---|---|---|
| *H04B 7/185* | (2006.01) | |
| *H01Q 1/42* | (2006.01) | |
| *H01Q 21/00* | (2006.01) | |
| *H01Q 21/22* | (2006.01) | |
| *H04W 16/28* | (2009.01) | |
| *H01Q 1/28* | (2006.01) | |
| *H01Q 1/36* | (2006.01) | |

(52) U.S. Cl.
CPC ........... *H04B 7/1858* (2013.01); *H01Q 1/288* (2013.01); *H01Q 1/364* (2013.01); *H01Q 1/42* (2013.01); *H01Q 21/0025* (2013.01); *H01Q 21/22* (2013.01); *H04B 7/18515* (2013.01); *H04B 7/18517* (2013.01); *H04W 16/28* (2013.01)

(58) Field of Classification Search
CPC ........... H01Q 1/288; H01Q 21/22; H01Q 3/26
See application file for complete search history.

(56) References Cited

U.S. PATENT DOCUMENTS

2018/0337722 A1* 11/2018 Paulsen ............... H01Q 21/061

OTHER PUBLICATIONS

H. Schippers et al., "Broadband Conformal Phased Array with Optical Beam Forming for Airborne Satellite Communication," IEEE Aerospace Conference, Mar. 2008.
H. Zhou et al., "Evolution of Satellite Communication Antennas on Mobile Ground Terminals," International Journal of Antennas and Propagation, vol. 2015, Jul. 2015.
K. Dredge et al., "LEO constellations and tracking challenges," available at www.satellite-evolution.com, Sep./Oct. 2017.
I. Montesinos et al., "GEODA: Conformal adaptive antenna of multiple planar arrays for satellite communications," IEEE Antennas and Propagation Society International Symposium, Jul. 2008.

* cited by examiner

Primary Examiner — Chandrahas B Patel
(74) Attorney, Agent, or Firm — Haynes and Boone, LLP (57) ABSTRACT

Examples disclosed herein relate to a phased array antenna system for use with a Low Earth Orbit ("LEO") satellite constellation. The phased array antenna system has a plurality of antenna panels positioned in a dome and an antenna controller to control the plurality of antenna panels, the controller directing a first antenna panel to transmit a first signal and a second antenna panel to transmit a second signal to a LEO satellite, the first signal having a first phase and the second signal having a second phase different from the first phase.

17 Claims, 7 Drawing Sheets

PHASED ARRAY ANTENNA FOR USE WITH LOW EARTH ORBIT SATELLITE CONSTELLATIONS

CROSS-REFERENCE TO RELATED APPLICATIONS

This application claims priority to U.S. Provisional Application No. 62/677,599, filed on May 29, 2018, and incorporated herein by reference in their entirety.

BACKGROUND

Low Earth Orbit ("LEO") satellite constellations have emerged as the new frontier for broadband Internet services. A LEO is an orbit around Earth with an altitude of 1,200 miles (2000 Km) or less, and an orbital period anywhere between 84 and 127 minutes. LEO satellites move very quickly relative to Earth's surface to stay in orbit. With a full trip around Earth in about 100 minutes, a single LEO satellite is likely in view of a user for about 10 minutes at a time. Providing broadband connectivity to users on Earth therefore requires a LEO satellite constellation capable of handling satellite handoffs and managing propagation losses that occur between the satellites and ground stations on Earth.

A ground station on Earth typically includes an antenna system to transmit and receive signals to/from the LEO satellite constellation. The antenna system may operate in the millimeter wave spectrum covering frequencies between 30 and 300 GHz or a portion thereof. Achieving high antenna performance and gain in millimeter wave frequencies poses design challenges for ground stations, gateways and user terminals. One design challenge is to steer the antenna beams into different directions to reach the LEO satellite constellation while minimizing losses and antenna squint.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

Systems and methods for a phased array antenna for use with LEO satellite constellations are disclosed. The systems and methods are suitable for many different applications and can be deployed in a variety of different environments and configurations. In various examples, the systems and methods are used in ground stations, gateways or user terminals to transmit/receive RF signals to LEO satellite constellations. The ground stations, gateways, or user terminals can be stationary in fixed geographical locations in the Earth or mobile such as on top of or within airplanes, drones, yachts, vehicles, and so on. The phased array antenna is an array of antennas providing RF beams in different directions.

Figure 1:
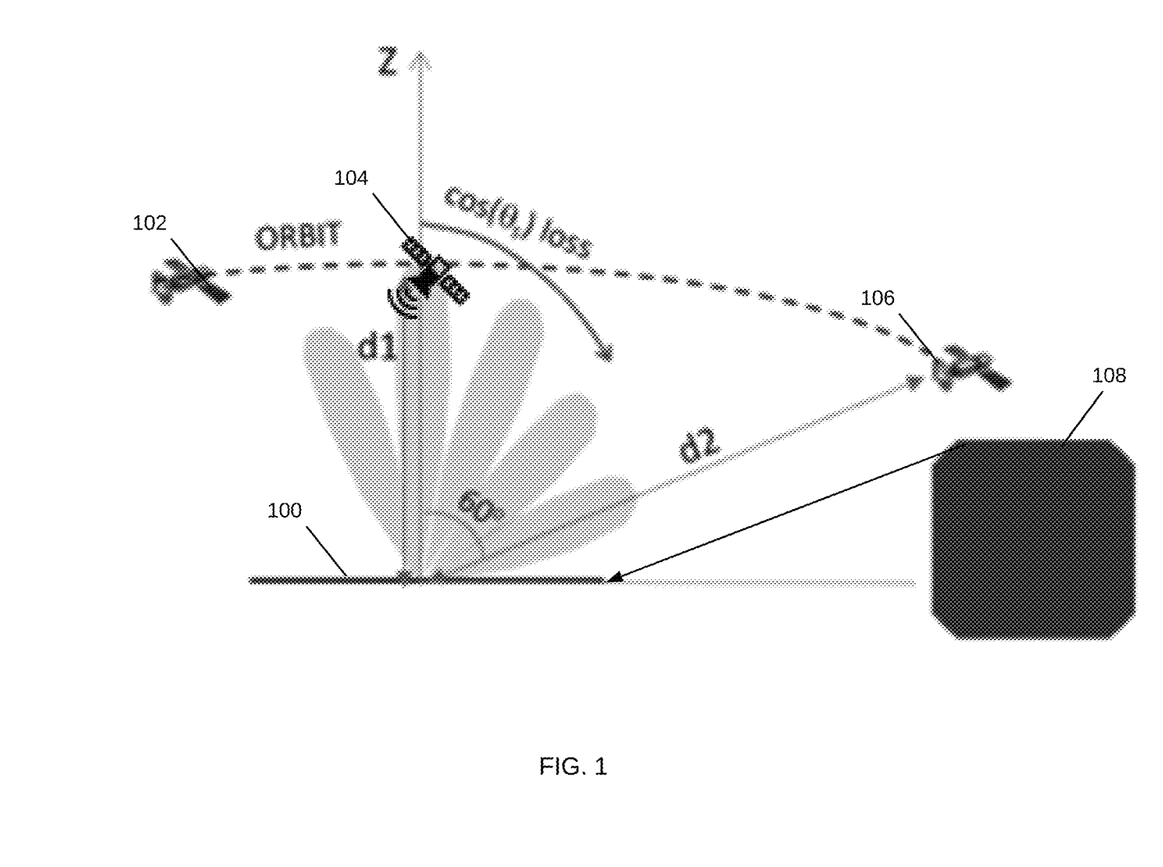
FIG. 1 is a schematic diagram of an example phased array antenna for LEO satellite constellations.

FIG. 1 illustrates a schematic diagram of an example phased array antenna for LEO satellite constellations. Phased array antenna 100 is a single antenna on a LEO satellite ground terminal 108 capable of providing RF beams in different directions, such as RF beams in the millimeter wave spectrum. Antenna 100 may be able to transmit RF signals to LEO satellites in a portion of the millimeter wave spectrum and receive RF signals from the LEO satellites in the same or another portion of the spectrum, such as the LEO satellite moving in orbit in positions 102-106. Antenna 100 may be in a fixed or mobile ground station, gateway, or user terminal.

As shown, antenna 100 is at boresight at a distance d1 from the LEO satellite in position 104 at a zenith angle of 0°. At boresight, the antenna 100 is at a minimum distance from the LEO satellite in position 104 and achieves its maximum gain. At a maximum slant of for example 60°, the distance from antenna 100 to the LEO is the maximum possible distance d2. At this maximum slant, the antenna 100 loss is at a maximum, with a 3 dB cosine loss and mismatch loss due to mutual coupling. That is, at the maximum slant, the distance is the maximum distance and the loss is the maximum loss. At d1, the antenna 100 is at maximum gain but at the minimum distance d1. Ideally, antenna 100 should be positioned such that it achieves its maximum gain at the maximum distance.

Figure 2:
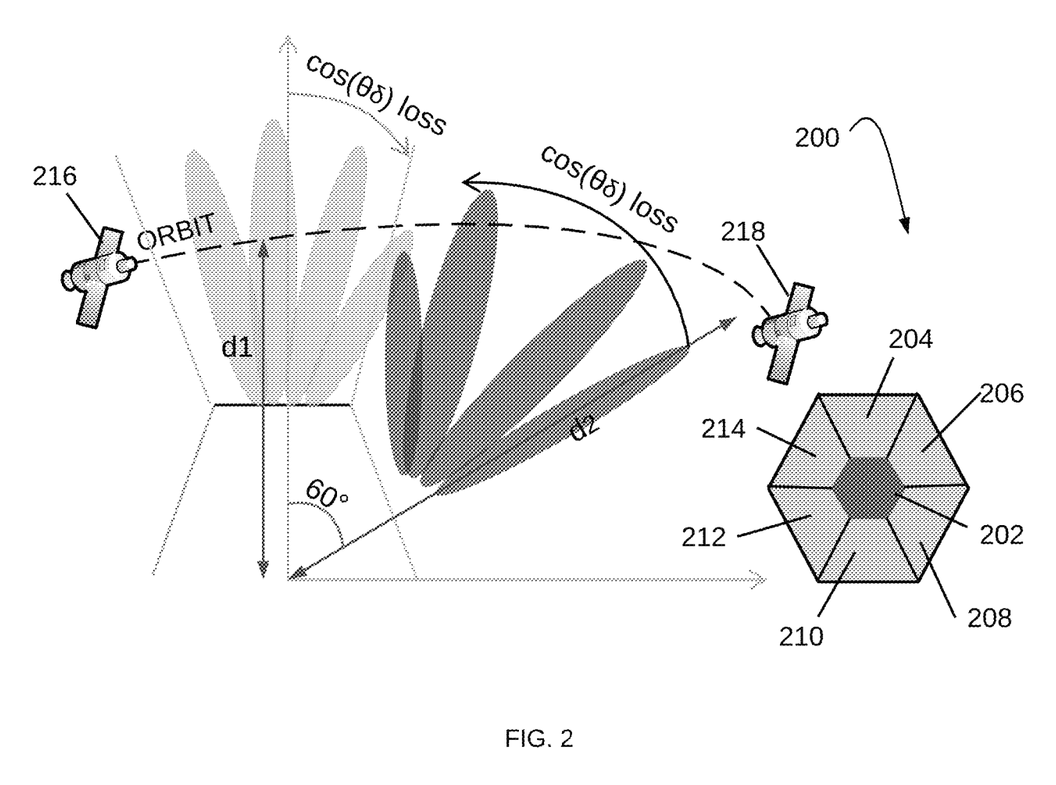
FIG. 2 is a schematic diagram of another example phased array antenna for LEO satellite constellations.

FIG. 2 illustrates another example phased array antenna with dynamic loss compensation. Antenna 200 is a phased array antenna with multiple antenna panels in a dome configuration. As shown, there are seven antenna panels in the phased array: a top antenna panel 202 and six side antenna panels 204-214 seen from the cutout perspective. In one example, the top antenna panel 202 could operate in conjunction with one of the side antenna panels 204-214. One side antenna could be oriented with its boresight coinciding with the max slant direction, so as to have maximum gain from the antenna 200 at its maximum slant. Then, when the side antenna panel starts steering, the orbital distance decreases balancing out the cosine loss. Individual antenna panels can have a smaller angular span, as satellite tracking is handed over to the top antenna panel 202 or the other side antenna panels 204-214, based on their location. Multiple of the antenna panels can be activated simultaneously to maximize the overall antenna gain. Each antenna panel 202-214 may be controlled to focus on a given angular span. Note that in this configuration, antenna 200 is able to dynamically compensate for propagation and cosine loss while having a small and compact design. In contrast, in the single antenna configuration of FIG. 1, each 3 dB in loss compensation results in a doubling of the antenna size.

It is appreciated that the proposed antenna configuration of antenna 200 optimizes the antenna performance and the overall aperture cost for tracking and communicating with LEO satellites, such as the LEO satellite moving in orbit from position 216 to position 218. Differentiating with classical antenna design using multiple panels to reduce the large beam steering loss due to low elevation angles from ground antennas to LEOs, the proposed architecture for antenna 200 and its associated beamforming procedure make full use of the effective apertures. At least two of the antenna panels 202-214 receive and transmit LEO signals simultaneously. The antenna configuration of antenna 200 enables signals received from LEO satellites to be phase-aligned and power-combined, or signals transmitted to the LEO satellites to be power-divided and phase-aligned as desired.

For example, the signal components received by each element of one panel are phase-aligned and then power-combined, with both the top-panel 204 and the side-panels 206 and 214. In receive, the two combined signals are phase-aligned and then power-combined again, to enhance the signal-to-noise ratio, improving the reception performance. In transmit, the transmit signals are then phase-shifted and power-divided and then fed to the two side panels 206 and 214. Each of these signals is power-split and phase-shifted to the elements of the two panels 206 and 214, respectively, and then sent from the two panels, improving their transmitting performance. Sometimes and more frequently, similar operations are performed with three panels, two side-panels and one top-panel. Beamforming is extended to multiple panels for performance improvement.

In tracking mode, the proposed multiple antenna configuration of antenna 200 also leverages all the advantages brought by its extended antenna aperture due to multiple panels involved in the operation. For example, the accuracy of angle-of-arrival ("AoA") estimations using the proposed phased array antenna 200 with its multiple antenna panels 202-214, in both orbit plane and in the perpendicular direction of the orbit plane, can be improved due to its beam-steering and phase-shifting capabilities. When the 3D location of the LEOs can be estimated with improved accuracy, its range estimation can be also improved. And as the in-orbit LEO ground speed can also be estimated or refined, based on a prediction of the LEO's position, a more accurate LEO's orbit position calculation can improve the link performance during tracking.

In addition, using multiple antenna panels in ground stations, instead of only one panel, in LEO communication systems, the overall amount of the hardware will be less than when only a single panel is used to achieve the same overall antenna performance. This is appreciated by observing that in the case of a single panel, the aperture must be dimensioned according to the worst case, which corresponds to the lowest elevation angle. In contrast, in the proposed configuration of antenna 200 using multiple antenna panels with say 2-3 panels working together, the beam steering loss due to low elevation angles is compensated by the different panel orientation angles. The one-panel configuration would have an unnecessary performance margin in most of the time of its operation and in particular, when LEOs are in the area near to ground station's zenith. This loss can be avoided due to the proposed antenna system configurations and the associated signal processing procedures. The proposed antenna configuration 200, as well as the associated signal processing procedures, jointly optimize the benefits of using a multiple panel antenna configuration in communication, range and direction estimation.

Figure 3:
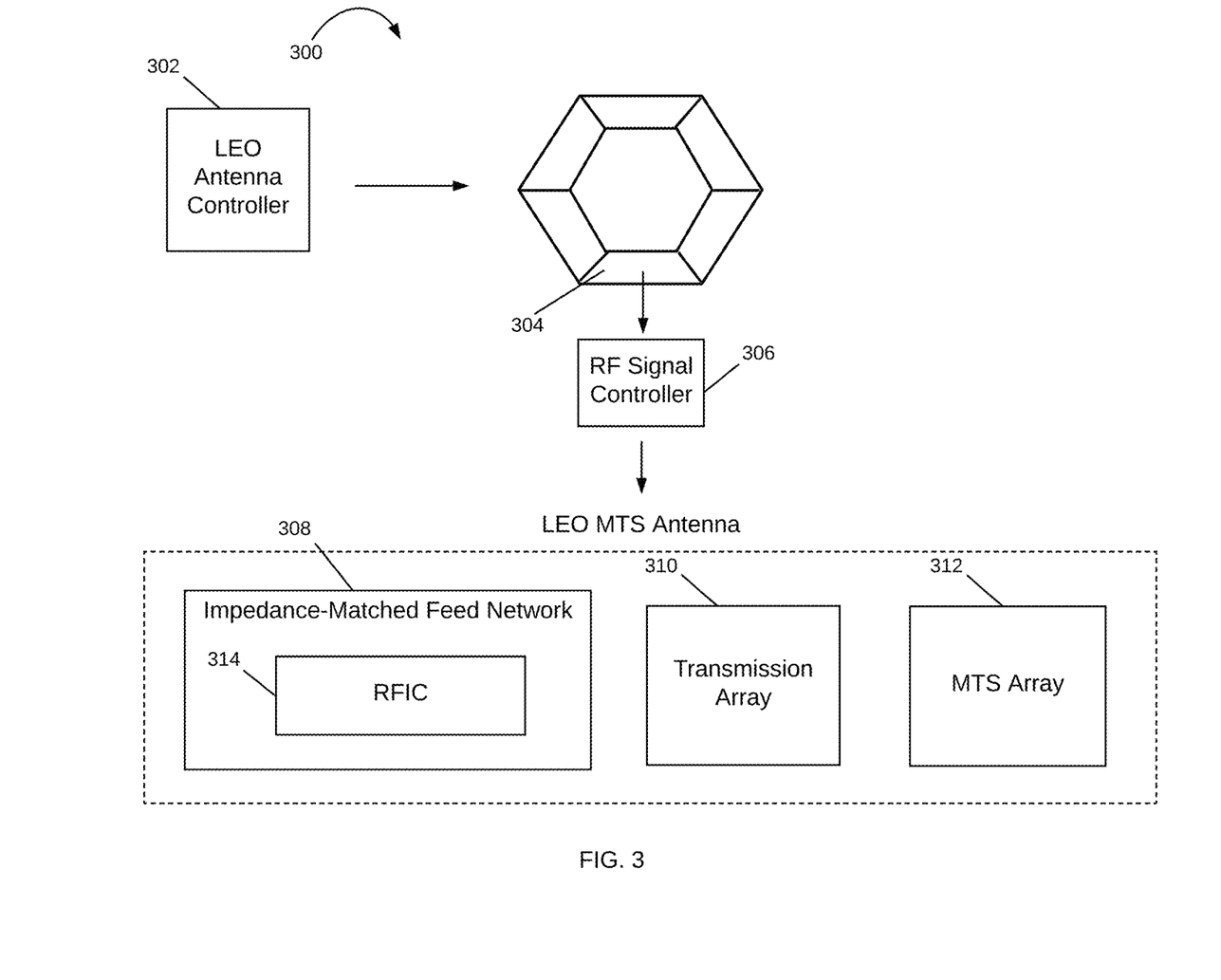
FIG. 3 is a schematic diagram showing additional details for the phased array antenna of FIG. 2.

Attention is now directed to FIG. 3, which illustrates a schematic diagram with additional details for the phased array antenna of FIG. 2. Phased array antenna 300 is controlled by a LEO antenna controller 302 and has 7 LEO antenna panels. In one example, each LEO antenna panel is a Meta-Structure ("MTS") antenna such as LEO antenna 304. A meta-structure, as generally defined herein, is an engineered, non- or semi-periodic structure that is spatially distributed to meet a specific phase and frequency distribution. In various examples, the LEO antenna 304 is an array of MTS cells, wherein each cell may be individually and dynamically controlled. The MTS array may be configured into subarrays that have specific characteristics, such as by having each subarray configured to reflect signals at a specific angle.

In operation, the antenna controller 302 is responsible for directing the LEO antenna 304 to generate RF beams with determined parameters such as beam width, transmit angle, and so on. The antenna controller 302 may also determine a voltage matrix to apply to phase shifters coupled to the LEO antenna 304 to achieve a desired phase shift profile for the antenna 304. The phase shifters may include a varactor or a phase shift network in an RFIC 314 to provide any desired phase shift up to 360°. The phase shift network may include multiple phase shifters, each with one or more varactors, to achieve the desired phase shift. In some examples, the LEO antenna 304 is adapted to transmit a directional beam through active control of the phase shifters in RFIC 314 coupled to MTS cells that make up the LEO antenna 304.

An RF signal controller 306 generates a signal for transmission and provides it to the LEO antenna 304. The signal propagates through an impedance-matched feed network 308 to a transmission array 310 and an MTS array 312 for transmission through the air. The impedance-matched feed network 308 includes impedance matching mechanisms for respectively matching input signal parameters with the MTS cells in the MTS array 312. The impedance matching mechanisms work in coordination with the RFIC 314 to provide phase shifting of the radiating signal(s) from the MTS array 312. As illustrated, RFIC 314 is integrated to feed network 308 for providing phase shift control to each subarray or cell in MTS array 312. In other examples, RFIC 314 may be integrated with the transmission array 310 such that a phase shifter is coupled to a transmission line leading to a subarray of MTS cells in the MTS array 312. In yet other examples, the RFIC 314 may be integrated with the MTS array 312, with each phase shifter in RFIC 314 providing phase shift control to an MTS cell or subarray of cells in MTS array 312.

Note that with the illustrated dome configuration, two-dimensional phase shifting can be realized in the MTS array 312 so that each MTS cell or subarray of MTS cells can have its phase control signals combined. In various examples, a switch network can be used for variable antenna system reconfigurations. For example, when LEOs are on the zenith area, only the top-panel is used and side-panels are off. In other examples, when LEOs are at the range of 50° to 75° elevation and +30° and −30° azimuth range relative to altitude direction for the side-panels 206 and 208, one or two side-panels and the top-panel are used.

It is appreciated that handovers in elevation angle can be performed according the order "side-panel(s) only" to "top-panel+side-panel(s)" and then from "top-panel+side-panel(s)" to "top-panel only". The handover edges are 50° for handover from "side-panel(s) only" to "top-panel+side-panel(s)", and the 75° for handover from "top-panel+side-panel(s)" to "top-panel only". This design limits beam steering loss to cos(30°) or 0.625 dB at handover edge. With the handover, using two panels, this loss can be compensated using an additional panel's power combining gain. After the handover from 2-3 panels to one-panel, the range from LEO to ground station is shortened and beam steering loss compensation is no longer necessary until the next handover edge is reached.

Figure 4:
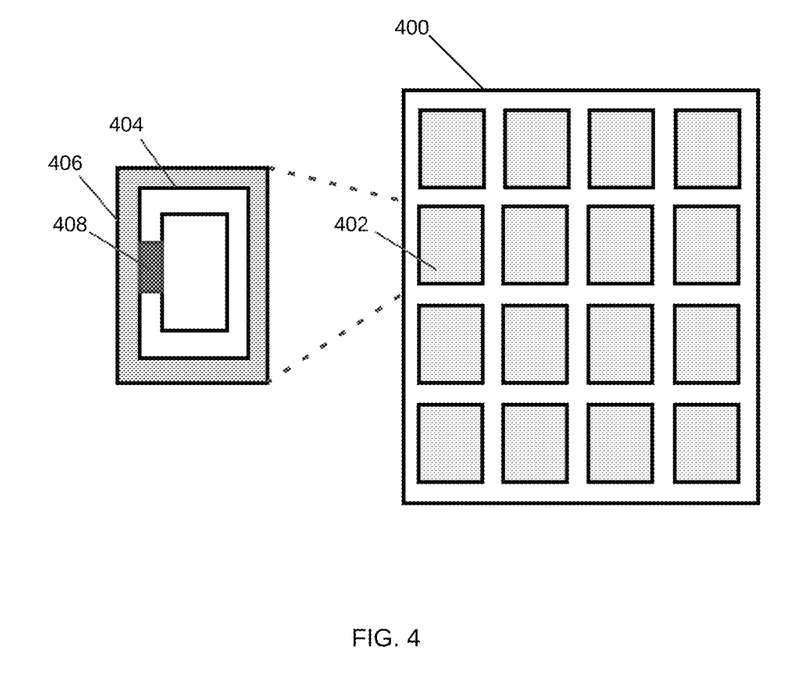
FIG. 4 illustrates an MTS array of MTS cells in accordance with various examples.

FIG. 4 illustrates an MTS array of MTS cells in accordance with various examples. MTS array 400 contains multiple MTS cells positioned in one or more layers of a substrate and coupled to other circuits, modules and layers, as desired and depending on the application. In various examples, the MTS cells are metamaterial ("MTM") cells. MTM cell 402 is illustrated having a conductive outer portion or loop 404 surrounding a conductive area 406 with a space in between. Each MTM cell 402 may be configured on a dielectric layer, with the conductive areas and loops provided around and between different MTM cells.

In the illustrated example, a voltage controlled variable reactance device 408, e.g., a varactor, provides a controlled reactance between the conductive area 406 and the conductive loop 404. The controlled reactance is controlled by a voltage applied from an antenna controller implemented as in FIG. 3, such as an applied reverse bias voltage in the case of a varactor. The change in reactance changes the behavior of the MTM cell 402, enabling the MTM array 400 to provide focused, high gain beams directed to a specific location. In other examples, phase shifts are provided to each MTM cell or subarrays of MTM cells in array 400 by an RFIC coupled to the MTM array 400, such as the RFIC 314 of FIG. 3 having a phase shift network. In those examples, each MTM cell is configured without a varactor between its conductive area and conductive loop as the phase shift is provided from the RFIC instead of the varactor. It is appreciated that other configurations may include additional circuits, modules and layers integrated with the MTM array 400.

As generally described herein, an MTM cell such as cell 402 is an artificially structured element used to control and manipulate physical phenomena, such as the electromagnetic ("EM") properties of a signal including its amplitude, phase, and wavelength. Metamaterial structures behave as derived from inherent properties of their constituent materials, as well as from the geometrical arrangement of these materials with size and spacing that are much smaller relative to the scale of spatial variation of typical applications. A metamaterial is not a tangible new material, but rather is a geometric design of known materials, such as conductors, that behave in a specific way. An MTM cell may be composed of multiple microstrips, gaps, patches, vias, and so forth having a behavior that is the equivalent to a reactance element, such as a combination of series capacitors and shunt inductors. Various configurations, shapes, designs and dimensions are used to implement specific designs and meet specific constraints. In some examples, the number of dimensional freedom determines the characteristics, wherein a device having a number of edges and discontinuities may model a specific-type of electrical circuit and behave in a similar manner. In this way, an MTM cell radiates according to its configuration. Changes to the reactance parameters of the MTM cell result in changes to its radiation pattern. Where the radiation pattern is changed to achieve a phase change or phase shift, the resultant structure is a powerful antenna or radar, as small changes to the MTM cell can result in large changes to the beamform.

The MTM cells include a variety of conductive structures and patterns, such that a received transmission signal is radiated therefrom. In various examples, each MTM cell has some unique properties. These properties may include a negative permittivity and permeability resulting in a negative refractive index; these structures are commonly referred to as left-handed materials ("LHM"). The use of LHM enables behavior not achieved in classical structures and materials, including interesting effects that may be observed in the propagation of electromagnetic waves, or transmission signals. Metamaterials can be used for several interesting devices in microwave and terahertz engineering such as antennas, sensors, matching networks, and reflectors, such as in telecommunications, automotive and vehicular, robotic, biomedical, satellite and other applications. For antennas, metamaterials may be built at scales much smaller than the wavelengths of transmission signals radiated by the metamaterial. Metamaterial properties come from the engineered and designed structures rather than from the base material forming the structures. Precise shape, dimensions, geometry, size, orientation, arrangement and so forth result in the smart properties capable of manipulating EM waves by blocking, absorbing, enhancing, or bending waves.

Figure 5:
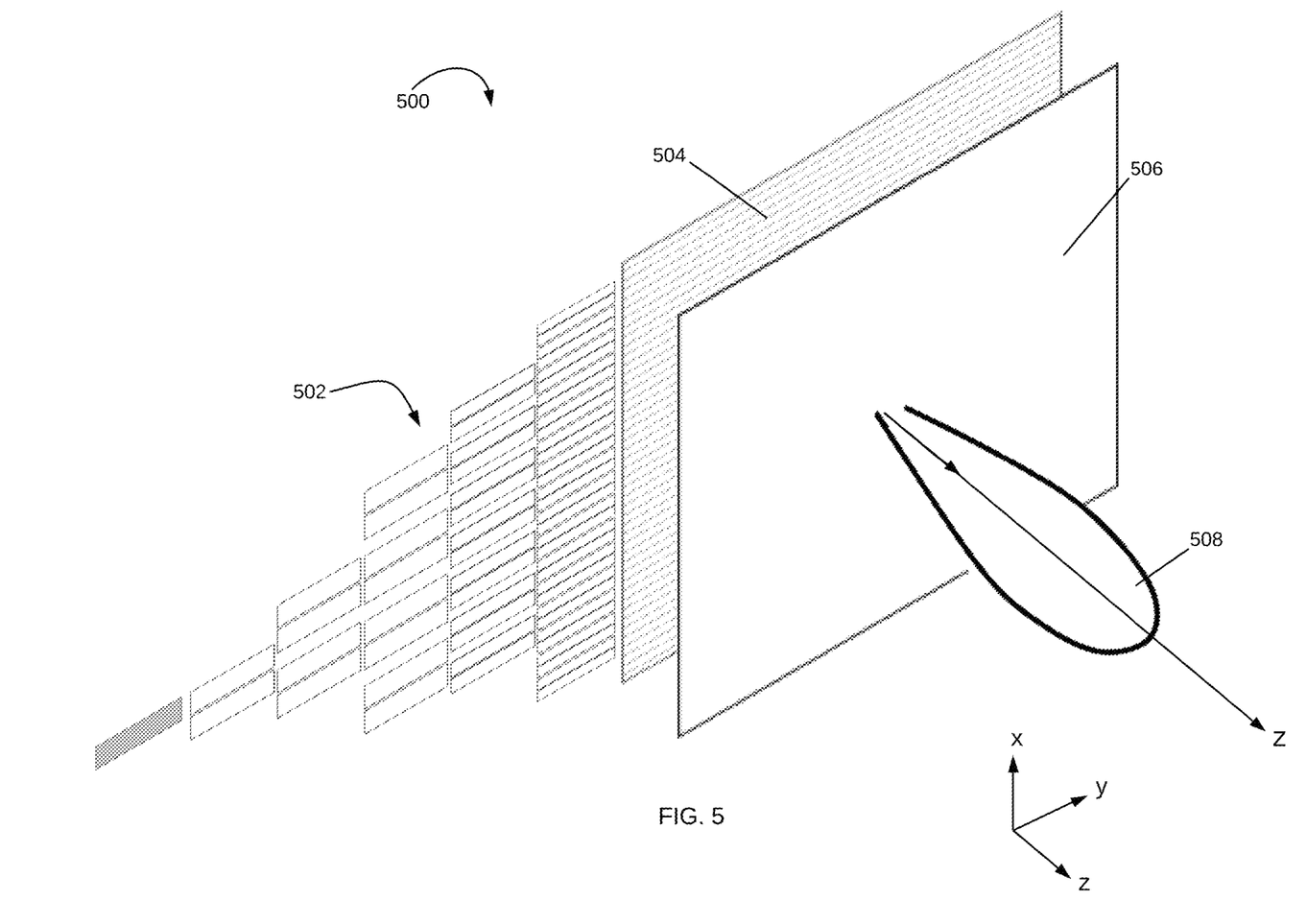
FIG. 5 is a schematic diagram of a LEO MTS antenna in accordance with various examples.

Attention is now directed to FIG. 5, which shows a schematic diagram of a LEO MTS antenna in accordance with various examples. LEO MTS antenna 500 has an impedance-matched feed network 502 that may be a power divider circuit. The feed network 502 feeds a layer of transmission lines 504, which are directed along the x-direction or length of the layer 504. In this way, a transmission signal is provided at the input and fed to feed network 504 having multiple stages or levels. The configuration illustrated may incorporate a variety of other circuits, structures or components to enable smooth operation, such as to provide impedance matching of the various levels and distribution points, including coupling to the layer 554 and individual transmission lines formed therein.

The transmission layer 504 is positioned proximate MTS array 506 such that signals propagate through layer 504 and are received at MTS layer 506 for radiation in the z-direction. The feed network 502 may take any of a variety of forms, and is illustrated here as a multi-layer, equally divided structure that feeds a plurality of transmission lines of layer 504. Each of the divided paths of feed network 502 feeds a transmission line of layer 504. The transmission lines are arranged such that a signal propagates through from the feed network 502 to an opposite end of the layer 504. Each transmission line may have a plurality of discontinuities positioned along its length. These discontinuities may be slots positioned within the transmission line that enable the propagating signal to travel through the slot forming electromagnetic radiation transmissions that feed layer 504 into the air or free space. The beam form and direction of the radiated signal from layer 506 is formed by an MTS array of unit cells which are controlled so as to change the resultant beamform. The layer 506 may also output multiple beamforms by allocating subarrays or by controlling the parameters of the unit cells. An RFIC as implemented in FIG. 3 provides phase shifts to individual MTS cells or subarrays of MTS layer 506.

Figure 6:
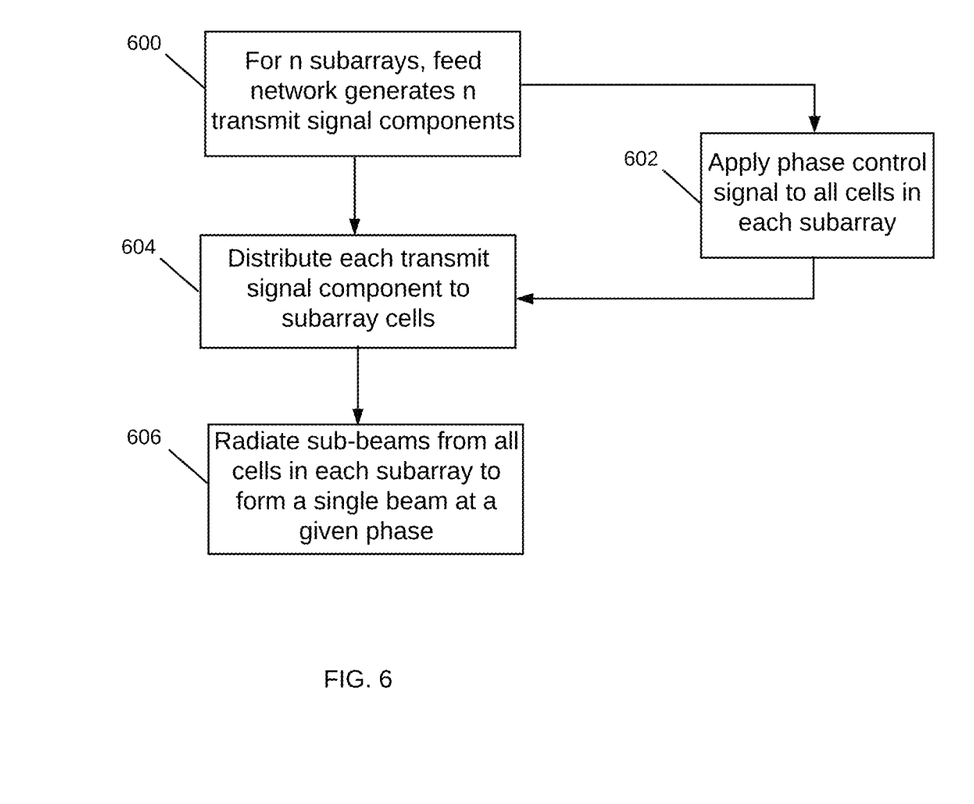
FIG. 6 is a flowchart for transmitting signals to a LEO satellite with a phased array antenna in accordance with various examples.

Attention is now directed to FIG. 6, which is a flowchart for transmitting signals to a LEO satellite with a phased array antenna in accordance with various examples. First, in a phased array antenna having n subarrays of MTM cells, the feed network generates n transmit signal components, each transmit signal component generated for each subarray (600). Next, phase control signals are pre-conditioned and applied to all the cells within each subarray (602). The phase control signals provide voltages to the MTM cells for generating phase shifts that result in beamforming signals at the direction of the phase shift. Each transmit signal component is distributed to the MTM cells in each subarray with their phases aligned (604). The transmit signal components are then radiated as sub-beams in the subarray cells to form a single beam at a given phase (606).

Figure 7:
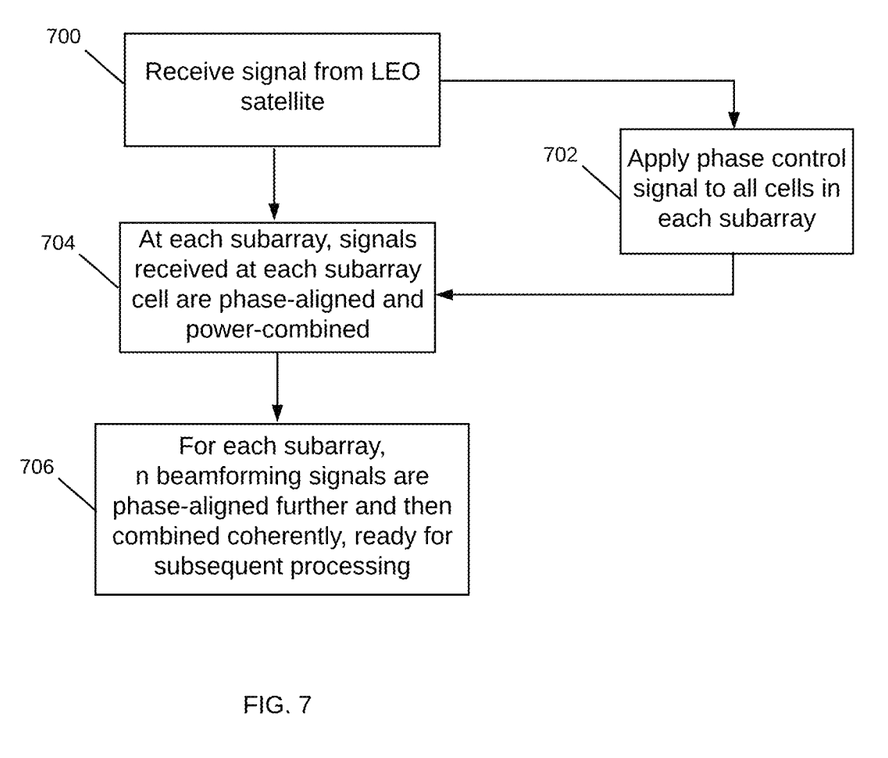
FIG. 7 is a flowchart for receiving signals from a LEO satellite at a phased array antenna in accordance with various examples.

FIG. 7 is a flowchart for receiving signals from a LEO satellite at a phased array antenna in accordance with various examples. First, signal from a LEO satellite is received at a phased array antenna having n subarrays of MTM cells (700). Next, phase control signals are pre-conditioned and applied to all the cells within each subarray (702). The phase control signals provide voltages to the MTM cells for generating phase shifts that result in beamforming signals at the direction of the phase shift. At each subarray, the signals received at their individual MTM cells are phase-aligned and power-combined (704). From each subarray, n beamformed signals are phase-aligned further and then combined coherently, ready for subsequent processing at the satellite ground terminal. As described above, the beamforming and phase control capabilities of the phased array antenna configuration disclosed herein enhance the signal-to-noise ratio and improves the overall transmit and receive performance of a LEO satellite ground terminal.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A phased array antenna system for use with a Low Earth Orbit ("LEO") satellite constellation, comprising:
    a plurality of antenna panels positioned in a dome, wherein each of the plurality of antenna panels comprises an array of meta-structure cells; and
    an antenna controller to control the plurality of antenna panels, the controller directing a first antenna panel to transmit a first signal and a second antenna panel to transmit a second signal to a LEO satellite, the first signal having a first phase and the second signal having a second phase different from the first phase.

2. The phased array antenna system of claim 1, wherein each of the plurality of antenna panels further comprises a feed network.

3. The phased array antenna system of claim 2, wherein each of the plurality of antenna panels further comprises an RFIC (radio-frequency integrated circuit) coupled to the feed network.

4. The phased array antenna system of claim 3, wherein the RFIC generates a plurality of phase shifts for a plurality of signals, each signal radiated from a meta-structure cell from the array of meta-structure cells with each phase shift.

5. The phased array antenna system of claim 1, wherein the meta-structure cells comprise metamaterial cells.

6. The phased array antenna system of claim 1, wherein the array of meta-structure cells is configured into a plurality of subarrays.

7. The phased array antenna system of claim 3, wherein the RFIC generates a plurality of phase shifts for a plurality of signals, each signal radiated from a subarray of meta-structure cells with each phase shift.

8. A phased array antenna system for use with a Low Earth Orbit ("LEO") satellite constellation, comprising:
    a plurality of antenna panels positioned in a dome, wherein each of the plurality of antenna panels comprises an array of meta-structure cells; and
    an antenna controller to control the plurality of antenna panels, the controller directing a first antenna panel to receive a first signal and a second antenna panel to receive a second signal from a LEO satellite, the first signal and the second signal aligned in phase.

9. The phased array antenna system of claim 8, wherein the array of meta-structure cells is configured into a plurality of subarrays.

10. The phased array antenna system of claim 8, wherein each of the plurality of antenna panels comprises a feed network.

11. The phased array antenna system of claim 10, wherein each of the plurality of antenna panels comprises an RFIC (radio-frequency integrated circuit) coupled to the feed network.

12. The phased array antenna system of claim 10, wherein the first signal and the second signal are combined in the feed network to improve a signal-to-noise ratio in the phased array antenna system.

13. A satellite ground terminal for use with a Low Earth Orbit ("LEO") satellite constellation, comprising:
    a phased array antenna having a plurality of metamaterial antenna panels positioned in a dome, wherein each of the plurality of metamaterial antenna panels comprises an array of metamaterial cells; and
    an antenna controller to control the plurality of metamaterial antenna panels to transmit and receive a plurality of beamforming signals at a plurality of phases.

14. The satellite ground terminal of claim 13, wherein at least one metamaterial cell in the array of metamaterial cells comprises a varactor.

15. The satellite ground terminal of claim 14, wherein the antenna controller controls a voltage applied to the varactor to generate a phase shift.

16. The satellite ground terminal of claim 13, wherein the plurality of beamforming signals received at a plurality of phases are combined in phase.

17. The satellite ground terminal of claim 13, wherein the array of metamaterial cells is configured into a plurality of subarrays, each subarray generating a signal at a given phase.

* * * * *